United States Patent
Benoit et al.

(10) Patent No.: US 7,419,192 B2
(45) Date of Patent: Sep. 2, 2008

(54) BRAZE-FREE CONNECTOR UTILIZING A SEALANT COATED FERRULE

(75) Inventors: Jeffrey T. Benoit, Willington, CT (US); Robert H. Dold, Monson, MA (US); Sivakumar Gopalnarayanan, Simsbury, CT (US); Lee A. Hoffman, Vernon, CT (US)

(73) Assignee: Carrier Corporation, Farmington, CT (US)

( * ) Notice: Subject to any disclaimer, the term of this patent is extended or adjusted under 35 U.S.C. 154(b) by 459 days.

(21) Appl. No.: 11/180,382

(22) Filed: Jul. 13, 2005

(65) Prior Publication Data

US 2008/0007048 A1    Jan. 10, 2008

(51) Int. Cl.
*F16L 19/06*    (2006.01)
(52) U.S. Cl. .................. 285/342; 285/295.2; 285/291.1; 285/332.1; 285/343
(58) Field of Classification Search ................. 285/247, 285/248, 249, 332.1, 332.2, 332.3, 339, 343, 285/342, 295.2, 291.1
See application file for complete search history.

(56) References Cited

U.S. PATENT DOCUMENTS

| | | | |
|---|---|---|---|
| 3,498,646 A * | 3/1970 | Depuy ......................... | 285/339 |
| 3,578,362 A * | 5/1971 | Cauthery .................... | 285/110 |
| 4,008,911 A * | 2/1977 | Kiyooka et al. ............. | 285/249 |
| 4,043,576 A * | 8/1977 | Reich et al. ................. | 285/322 |
| 4,138,145 A * | 2/1979 | Lawrence .................... | 285/23 |
| 4,381,549 A | 4/1983 | Stamp, Jr. et al. | |
| 4,429,578 A | 2/1984 | Darrel et al. | |
| 4,510,576 A | 4/1985 | MacArthur et al. | |
| 4,841,734 A | 6/1989 | Torrence | |
| 5,079,930 A | 1/1992 | Beaverson et al. | |
| 5,156,012 A | 10/1992 | Kuribara et al. | |
| 5,214,918 A | 6/1993 | Oguni et al. | |
| 5,217,261 A * | 6/1993 | DeWitt et al. ............. | 285/332.2 |
| 5,228,304 A | 7/1993 | Ryan | |
| H1226 H | 9/1993 | VanReene et al. | |
| 5,241,833 A | 9/1993 | Ohkoshi | |
| 5,248,168 A | 9/1993 | Chichester et al. | |
| 5,251,453 A | 10/1993 | Stanke et al. | |
| 5,295,360 A | 3/1994 | Olds et al. | |
| 5,297,826 A * | 3/1994 | Percebois et al. ........... | 285/232 |

(Continued)

FOREIGN PATENT DOCUMENTS

EP    0 159 281    5/1990

(Continued)

*Primary Examiner*—David E Bochna
(74) *Attorney, Agent, or Firm*—Marjama Muldoon Blasiak & Sullivan, LLP

(57) ABSTRACT

A braze-free connector suitable for use in a refrigeration system that includes a connector body having a circular opening passing therethrough. The opening has a converging section that tapers downwardly from the entrance to the opening toward the back of the opening. A ferrule is slidably mounted upon a refrigerant tube which is inserted into the opening to place a tapered collapsible section of the ferrule in contact with the tapered section of the opening. The non-collapsible section of the ferrule is keyed to a nut which in turn is mated with a male thread formed on the connector body whereby the collapsible section of the ferrule is forced into engagement with the refrigerant tube. A pressure sensitive sealant is precoated upon at least the collapsible section of the ferrule which is activated as the ferrule is forced into engagement with the refrigerant tube.

14 Claims, 4 Drawing Sheets

U.S. PATENT DOCUMENTS

| | | | |
|---|---|---|---|
| 5,354,103 | A | 10/1994 | Torrence et al. |
| 5,362,530 | A | 11/1994 | Kitami et al. |
| 5,374,084 | A | 12/1994 | Potokar |
| 5,381,669 | A | 1/1995 | Bahel et al. |
| 5,406,980 | A | 4/1995 | Allread et al. |
| 5,413,147 | A | 5/1995 | Moreiras et al. |
| 5,425,558 | A | 6/1995 | Dennany, Jr. |
| 5,463,377 | A | 10/1995 | Kronberg |
| 5,464,042 | A | 11/1995 | Haunhorst |
| 5,468,028 | A | 11/1995 | Olson |
| 5,474,336 | A | 12/1995 | Hoff et al. |
| 5,540,463 | A | 7/1996 | Potokar |
| 5,752,726 | A | 5/1998 | Fixemer |
| 5,834,943 | A | 11/1998 | Miller |
| 5,868,437 | A | 2/1999 | Teague |
| 5,961,157 | A | 10/1999 | Baron et al. |
| 6,012,743 | A | 1/2000 | Godeau et al. |
| 6,155,612 | A | 12/2000 | Szabo |
| 6,302,654 | B1 | 10/2001 | Millet et al. |
| 6,324,854 | B1 | 12/2001 | Jayanth |
| 6,354,332 | B1 | 3/2002 | Burkhardt et al. |
| 6,382,678 | B1 | 5/2002 | Field et al. |
| 6,481,756 | B1 | 11/2002 | Field et al. |
| 6,497,435 | B1 | 12/2002 | Luft et al. |
| 6,571,566 | B1 | 6/2003 | Temple et al. |
| 2002/0024218 | A1 | 2/2002 | Manuli |
| 2002/0096209 | A1 | 7/2002 | Danielson et al. |
| 2002/0141877 | A1 | 10/2002 | Jayanth et al. |
| 2002/0182005 | A1 | 12/2002 | Milhas |
| 2003/0089119 | A1 | 5/2003 | Pham et al. |
| 2003/0182950 | A1 | 10/2003 | Mei et al. |

FOREIGN PATENT DOCUMENTS

| | | | |
|---|---|---|---|
| EP | 0 308 160 | | 6/1991 |
| EP | 0 453 302 | | 10/1991 |
| EP | 0 289 369 | | 1/1992 |
| EP | 0 396 029 | | 9/1992 |
| EP | 0 550 263 | | 7/1993 |
| EP | 0 409 000 | | 2/1994 |
| EP | 0 529 758 | | 6/1996 |
| EP | 0 760 069 | | 3/1997 |
| EP | 0 843 794 | | 5/1998 |
| EP | 0 918 182 | | 5/1999 |
| EP | 1 238 838 | | 9/2002 |
| EP | 1 337 825 | | 8/2003 |
| GB | 2083153 A | * | 3/1982 |
| GB | 2 274 695 | | 8/1994 |
| JP | 62-218748 | | 9/1987 |
| JP | 62-261845 | | 11/1987 |
| JP | 63-302238 | | 12/1988 |
| JP | 2-110268 | | 4/1990 |
| JP | 2-195165 | | 8/1990 |
| JP | 4-55671 | | 2/1992 |
| JP | 4-190062 | | 7/1992 |
| JP | 4-273941 | | 9/1992 |
| JP | 5-99475 | | 4/1993 |
| JP | 5-231754 | | 9/1993 |
| JP | 5-256543 | | 10/1993 |
| JP | 7-55299 | | 3/1995 |
| JP | 8-68576 | | 3/1996 |
| JP | 8-261542 | | 10/1996 |
| JP | 8-261543 | | 10/1996 |
| JP | 2000-9048 | | 1/2000 |
| JP | 2000-154954 | | 6/2000 |
| JP | 2001-32884 | | 2/2001 |
| JP | 2001-141279 | | 5/2001 |
| WO | WO 93/20376 | | 10/1993 |
| WO | WO 95/30106 | | 11/1995 |
| WO | WO 95/30107 | | 11/1995 |
| WO | WO 95/33157 | | 12/1995 |
| WO | WO 96/17202 | | 6/1996 |
| WO | WO 97/12167 | | 4/1997 |
| WO | WO 97/13994 | | 4/1997 |
| WO | WO 97/13995 | | 4/1997 |
| WO | WO 97/47908 | | 12/1997 |
| WO | WO 00/45053 | | 8/2000 |
| WO | WO 01/23794 | | 4/2001 |

* cited by examiner

BRAZE-FREE CONNECTOR UTILIZING A SEALANT COATED FERRULE

FIELD OF THE INVENTION

This invention relates generally to a braze-free connector and in particular to a braze-free connector for joining refrigeration lines or for joining a refrigeration line to a related component of a refrigeration system such as a condenser or an evaporator.

BACKGROUND OF THE INVENTION

The reliability of a refrigerant system is related to the skill of the installer or the technician that services the unit. The industry, however, is faced with a decline in the number of skilled people who can effectively work on these machines. Among the tasks requiring the most skill to complete is the brazing of the many refrigerant line connections and, in particular, the task of brazing a line to a system component. Any leaks that might develop in these types of connections will result in leakage of refrigerant and reduce the amount of refrigerant charge resulting in a loss of system efficiency. The loss of charge, if not corrected, can also eventually lead to system failure.

A number of braze-free connectors have been developed for use with refrigerants. These devices were generally referenced as quick-connectors because of the limited amount of time needed to complete a connection. These devices are generally designed to be assembled and disassembled and are commonly used in several applications including in refrigeration systems. However, they are generally disfavored due to their tendency to leak and related reliability problems.

SUMMARY OF THE INVENTION

It is therefore an object of the present invention to improve braze-free connectors and in particular to improve braze-free connectors used in the refrigeration industry.

It is another object of the present invention to improve the reliability of braze-free connectors.

Yet another object of the present invention is to provide a high strength braze-free connector that has no significant reduction in strength when exposed to many refrigerants for long periods of time.

These and other objects of the invention are attained by means of a braze-free connector that includes a connector body having an opening for receiving a refrigerant tube therein. A ferrule is slidably mounted upon the tube and is secured inside a nut, which is threaded onto the connector body adjacent to the entrance whereupon the ferrule turns with the nut. The ferrule includes a collapsible section that is tapered, which is arranged to ride in contact with a similar tapered section in the connector opening. Accordingly, the collapsible section of the ferrule is forced inwardly into tight locking engagement around the tube. A pressure sensitive sealant is pre-coated upon the outer surface of the collapsible section of the ferrule so that as the ferrule advances into the opening, the sealant is activated. Score marks or other forms of indentations are made in the outer surface and/or inner surface of the collapsible section of the ferrule if necessary which is filled with sealant that to enhance the effectiveness of the pre-coated sealant to establish a leak tight joint.

BRIEF DESCRIPTION OF THE DRAWINGS

For a better understanding of these and other objects of the present invention, reference shall be made to the following drawings which is to be read in association with the following detailed description of the invention, wherein.

DETAILED DESCRIPTION OF THE INVENTION

Figure 1:
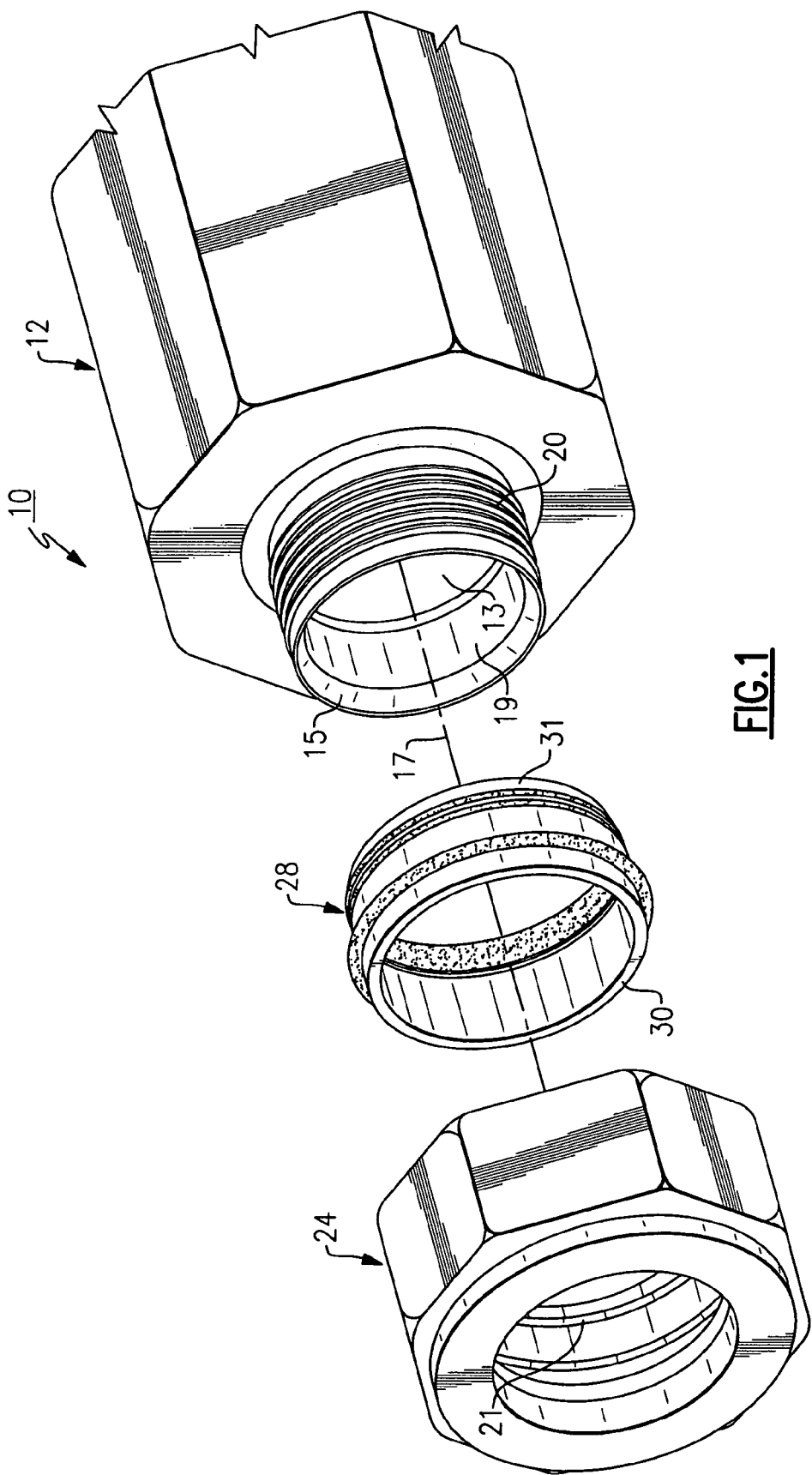
FIG. 1 is an exploded view in perspective illustrating a connector embodying the teachings of the present invention.
Figure 2:
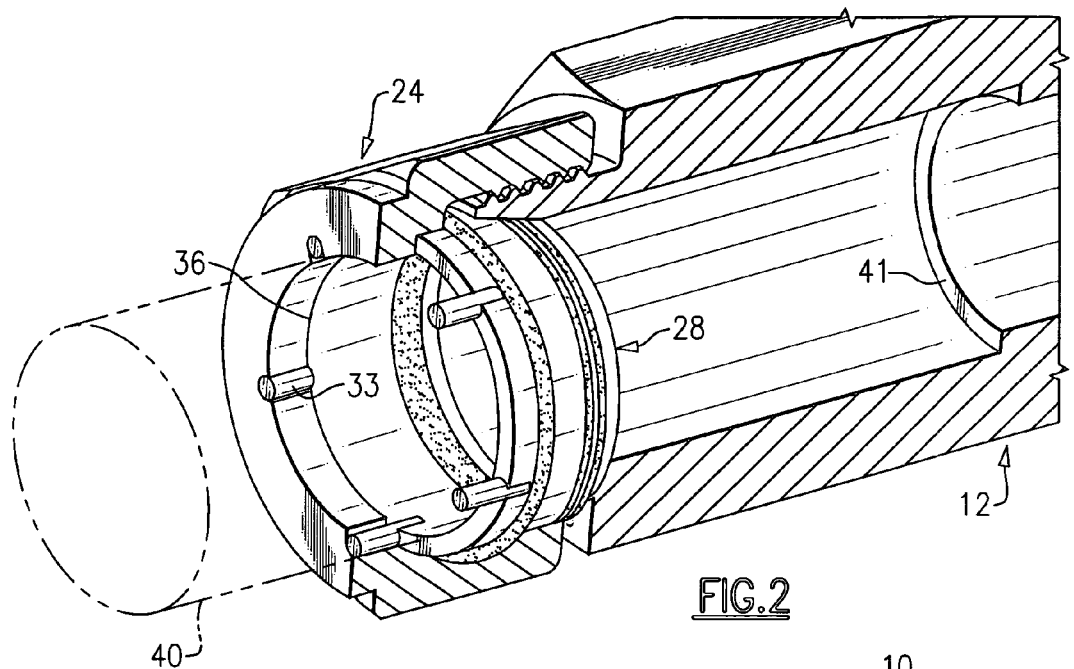
FIG. 2 is a partial sectional view in perspective illustrating one form of the invention.
Figure 3:
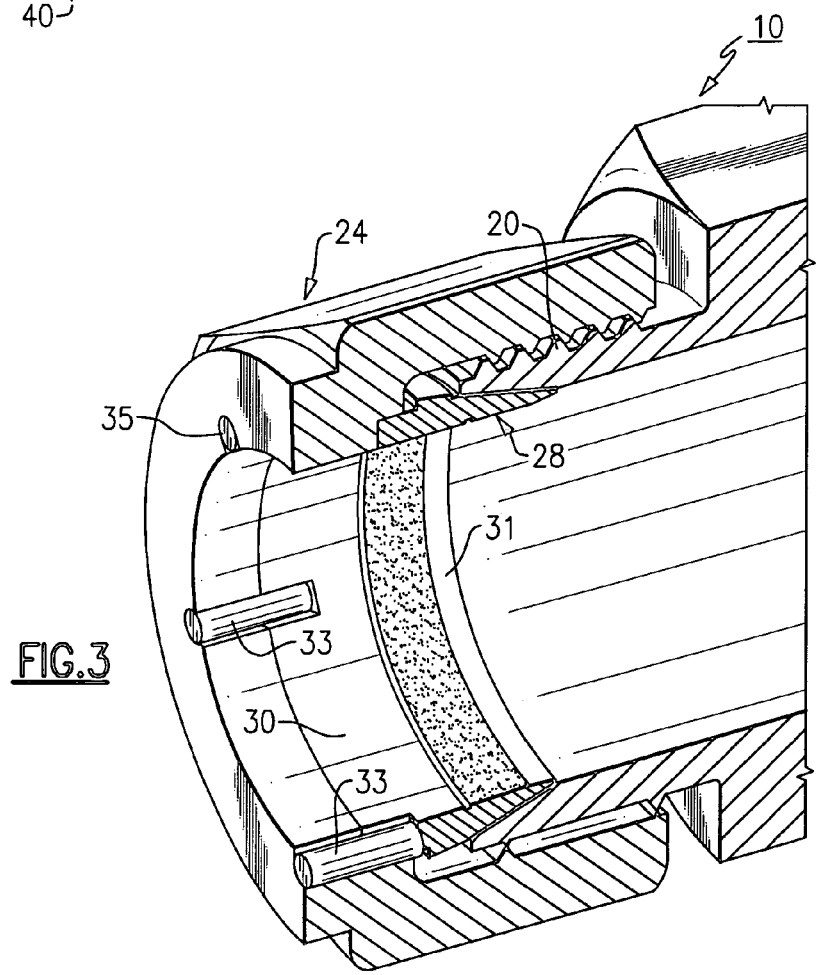
FIG. 3 is a partial sectional view in section similar to that shown in FIG. 2 with sections broken away to better illustrate the component parts of one form of the invention.

Referring initially to FIGS. 1-3, there is illustrated a connector, generally referenced 10, that embodies the teachings of the present invention. The connector includes a connector body 12 that is mounted upon a component of the system such as a heat exchanger or the like not shown. The connector body includes a central flow passage 13 that is circular in form and which passes through the body. The exit of the passages in most applications will be attached in fluid flow communication with a flow circuit within the system component. This type of mounting is generally achieved at the factory under controlled procedures and conditions and the joint between the system component and the connector body is seldom, if ever, broken.

A cylindrical coupler, generally referenced 15, is located at the front entrance of the connector body. The coupler is coaxially aligned along the central axis 17 of the connector body passage and forms an extension of the flow passage. The interior surface of the extended coupler contains a tapered section 19 that converges from the entrance of the coupler toward the back of the connector body, the purpose of which will be explained in further detail below.

Male threads 20 are provided upon the outer surface of the coupler. The male threads are arranged to mate with internal female threads 21 located inside a nut 24 so that the nut can be threaded onto the coupler. A cylindrical shaped ferrule, generally referenced 28, is contained within the nut. The ferrule possesses a non-compressible section 30 at the back of the piece that is integral with a tapered collapsible section 31 at the front of the piece. As best illustrated in FIGS. 2 and 3, in one of the embodiments of the invention, the non-compressible section of the ferrule is secured to the nut by a series of keys 33 that are circumferentially spaced about the nut. The keys are axially disposed cylindrical members that are press fitted into slots 35 that extend through the back face of the nut into the non-compressible section of the ferrule. Besides cylindrical, the keys can also be any of a variety of cross-sectional shapes. A shoulder 36 is provided in the inner surface of the nut against which the back face of the ferrule is registered.

In assembly, a refrigerant tube 40 is slidably mounted upon the ferrule and nut collapsible fitting and is inserted into the passage of the connector so that the end force of the tube is registered against a shoulder 41 located inside the passage (see FIG. 2). The nut is then threaded upon couplers to move the ferrule through the entrance of the passage. The tapered collapsible section 31 at the front of the ferrule then comes into contact with the tapered inner surface 15 of the connector body (see FIG. 1). This, in turn, causes the collapsible section of the ferrule to be forced into contact with the refrigerant tube to create a tight mechanical joint between the inner surface of the ferrule and the outer surface of the tube. The taper on the collapsible end of the ferrule generally compliments the taper in the passage so that a relatively large contact area is established between the ferrule and the tapered section of the passage as well as the ferrule and the tube thus holding the refrigerant tube securely in assembly. To improve the leak tightness of this joint, the outer and inner surfaces of the collapsible section, and other nearby areas, of the ferrule are pre-coated with a pressure sensitive sealant which is activated as the compression fitting made up of the nut and ferrule both compresses and shears the sealant coating. The sealant on the outside surface of the ferrule enhances the sealing between the ferrule and the housing while the sealant on the edges and the inside surface, enhances the sealing action between the ferrule and the refrigerant tubing. A sealant available from Minnesota Mining and Manufacturing Co. (3M) identified under the trade name Scotch Grip 2510 has shown to provide a high strength, long life seal when exposed to many types of refrigerants in this application. The 3M 2510 sealant is a two component material containing the sealant and microcapsules containing an activator for the sealant. The material can be pre-coated onto the ferrule and dried. The sealant is activated at the time of assembly of the connector when the shearing action of the mechanical connection causes the microcapsules to break and cure the sealant creating leak-tight adhesive bond that augments the metal-to-metal seal of the joint.

In one embodiment of the invention, as shown in FIGS. 2 and 3, keys are provided to connect the nut and the ferrule. The turning action of the nut will rotate the ferrule thereby enhancing the shearing action of the microcapsules in the sealant material leading to an improved sealing action. The pins can be designed to shear at a present torque to prevent over-tightening of the nut.

Figure 4:
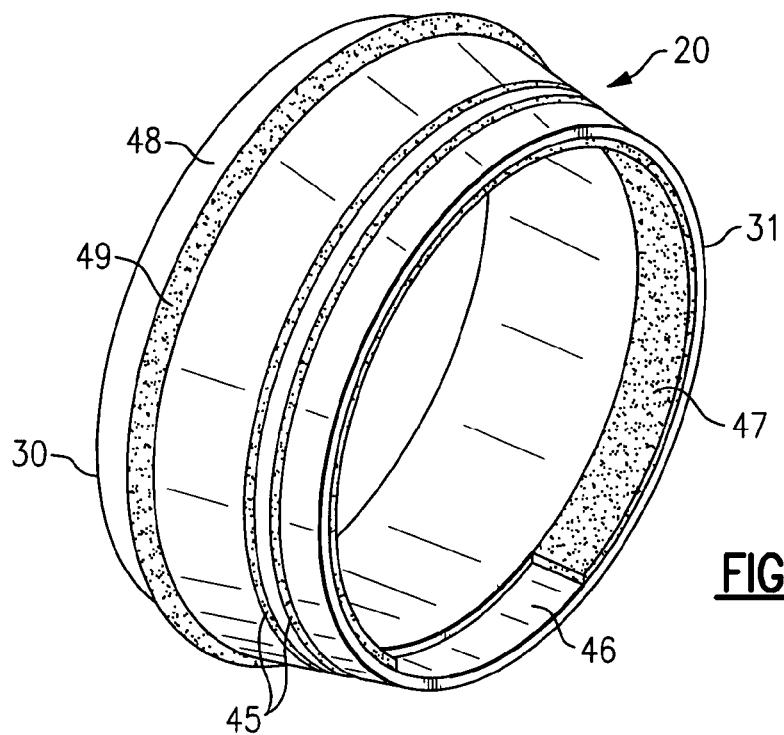
FIG. 4 is an enlarged perspective view of the ferrule shown in FIG. 1.

The ferrule, generally referenced 28 in FIG. 1, is shown in greater detail in FIG. 4. The outer surface of the collapsible section 31 is provided with a plurality of spaced apart circumferential indentations 45-45. The indentations can be formed by scoring the part or by another similar means that is known in the art. It has been found that placing such indentations in the ferrule surface enhances the ability to create a strong leak tight seal between the ferrule and the tapered passage section of the connector body. The indentations tend to retain the sealant where most needed, particularly when a compressive and shearing force is being applied and allows for storage of unfractured capsules after the initial sealed joint is formed. This, in turn, permits the compression fitting to be reused without having to be recoated if for some reason the initial sealed joint has to be broken.

In addition to the circumferential indentations, the ferrule is provided with a circular recess 46 on the inner surface of the collapsible section adjacent to this section's open end. Here again, the recess is pre-coated with a pressure sensitive sealant 47 that becomes activated when the compression fitting is mounted in the assembly. A second circular recess 48 is also provided in the outer surface of the non-collapsible section of the ferrule at the open end of the section. Sealant 49 is pre-coated adjacent to the shoulder formed by the recess. The sealant becomes activated as the ferrule is driven by the nut into the connector body to establish a seal between the outer surface of the non-compressible section of the ferrule and the nut.

Alternatively, the sealant material may be applied to just the ferrule or to the ferrule and the connector body and/or the refrigerant tube in locations where the parts are subjected to compressive and shearing forces that are high enough to release the encapsulated activator. Pre-coating of the parts can take place in the factory or in the field, but is preferably coated in the factory.

Figure 5:
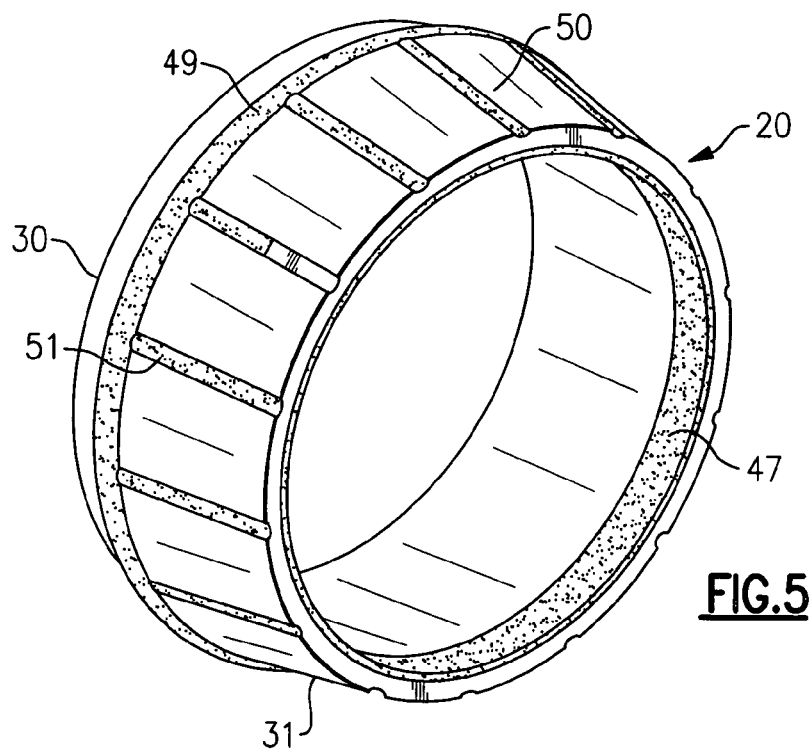
FIGS. 5-8 are further embodiments of ferrules suitable for use in the practice of the invention.

FIG. 5 shows a further embodiment of a ferrule that is suitable for use in the practice of the present invention. Here again, circular bands 47 and 49 of sealant material are pre-coated as noted above in recesses provided on the inner surface of the collapsible section 31 of the ferrule and the outer surface of the non-collapsible section. Here, spaced apart indentations 50-50 are extended axially along the outer surface of the collapsible section from the circular band 49 to the open end of the collapsible section.

Figure 6:
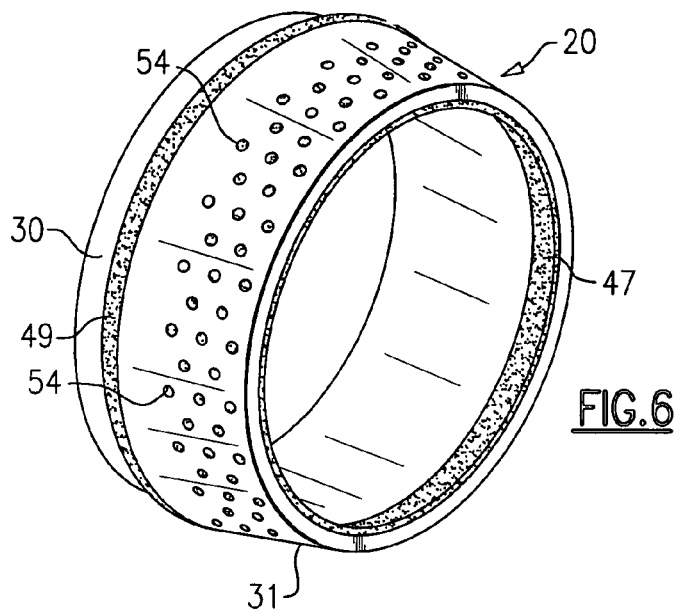

FIG. 6 illustrates a still further embodiment of a ferrule similar to that shown in FIG. 5 wherein the indentations on the outer surface of the collapsible section are replaced with dimpled indentations 54-54. The dimple can be randomly dispersed or situated in circular rows about the outer surface.

Figure 7:
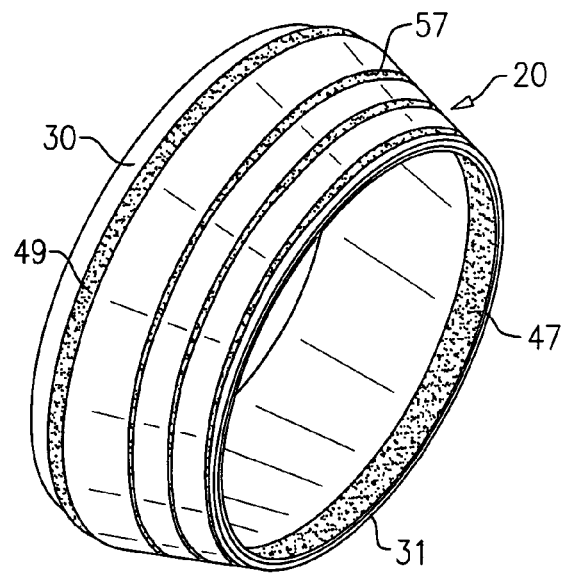

FIG. 7 shows another ferrule embodiment that is similar to the embodiment shown in FIG. 4. In this embodiment, the circumferential indentations on the outer surface of the collapsible section are replaced by a spiral groove 57 that makes a number of three hundred and sixty degree turns about the outer surface of the section. The helical groove can be either clockwise or counterclockwise.

Figure 8:
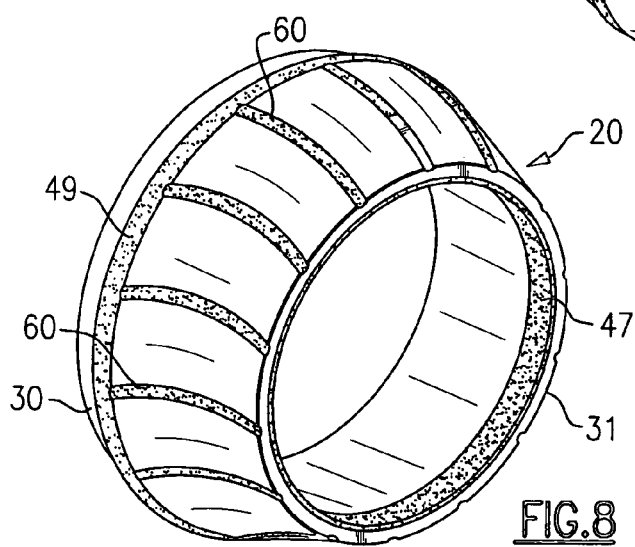

Lastly, FIG. 8 is a still further ferrule embodiment similar to that shown in FIG. 5. In this embodiment, the axially aligned indentations running along the outer surface of the collapsible section of the ferrule have been replaced with arcuate shaped grooves 60-60 that extend from the circular band 49 of sealant material to the front edge of the collapsible section.

While this invention has been particularly shown and described with reference to the preferred embodiment in the drawings, it will be understood by one skilled in the art that various changes in its details may be effected therein without departing from the teachings of the invention. For example, indentations can be formed on any surface upon which sealant is applied and may include the inner surface of the ferrule, the outer surface of the refrigerant tube, or the inner surface of the connector.

What is claimed is:

1. A braze free connector suitable for use in a refrigeration system that includes:

a connector body having a circular opening that passes through said body for receiving a refrigerant tube therein, said opening having a converging section that tapers downwardly from the entrance of the opening toward the rear of the opening;

a refrigerant tube insertable into said opening and having a ferrule slidably mounted upon the tube;

a drive member for advancing the ferrule into said opening;

said ferrule further including a non-collapsible section that is pushed by said drive member so that the ferrule moves into the connector body opening as the drive member is threaded upon the connector body and a collapsible section having an outer surface that is arranged to move into engagement with the converging section of the opening as the ferrule advances into the opening and an inner surface that is forced into engagement with the refrigerant tube when the ferrule has advanced a given distance into the opening; and a sealant that is pre-coated upon the outer and/or inner surface of the collapsible and/or non-collapsible section of the ferrule, said sealant containing a pressure responsive component for rapidly curing the sealant as the collapsible section of the ferrule is forced into engagement with said refrigerant tube.

2. The connector of claim 1 wherein the ferrule is connected to the drive member by a series of spaced apart axially disposed keys that are arranged to act between the drive means and the non-collapsible section of the ferrule.

3. The connector of claim 2 wherein said keys are cylindrical pins that are press-fitted into axially aligned slots formed in the drive and the non-collapsible section of the ferrule.

4. The connector of claim 2 that further includes a stop means located inside said connector body for intercepting said refrigerant tube and limiting the depth of penetration of said tube within said opening.

5. The connector of claim 2 wherein said pressure responsive component is a curing material that is contained within micro capsules dispersed throughout said sealant, said micro capsules being arranged to fracture as the collapsible section of the ferrule is forced into contact with said tube.

6. The connector of claim 2 wherein said drive member includes an internal thread that mates with an external thread upon the connector body wherein said ferrule rotates with the drive member as the ferrule advances into said opening.

7. The connector of claim 1 wherein the outer surface of said collapsible section of the ferrule contains at least one indentation that is filled with pre-coated sealant.

8. The connector of claim 1 wherein the outer surface of said collapsible section of the ferrule contains a plurality of spaced apart circular indentations that encircle the collapsible section of said ferrule.

9. The connector of claim 1 wherein the outer surface of the collapsible section of the ferrule contains a series of spaced apart helical indentations that encircle the collapsible section of said ferrule.

10. The connector of claim 1 wherein the outer surface of the collapsible section of the ferrule contains a series of axially disposed circumferentially spaced indentations that extend along the axial length of said collapsible section.

11. The connector of claim 10 that further includes at least one circular indentation that encircles the outer surface of the collapsible section and which passes through each of the axially disposed indentations.

12. The connector of claim 1 that further includes a series of dimple shaped indentations dispersed about the outer surface of the collapsible section of said ferrule.

13. The connector of claim 1 that further includes a circular recess formed in the inner surface of said collapsible section of the ferrule adjacent to the open end of the collapsible section and a sealant containing a pressure responsive component for rapidly curing the sealant filling said recess.

14. The connector of claim 1 wherein the inner surface of the connector body opening and the outer surface of the refrigerant tube contain indentations and said indentations and said indentations are filled with said pressure responsive sealant.

* * * * *